United States Patent [19]

Hoy et al.

[11] 4,209,605

[45] Jun. 24, 1980

[54] PROCESS FOR PRODUCING SHAPED POLYURETHANE HYDROGEL ARTICLES

[75] Inventors: Kenneth L. Hoy, Saint Albans; Allen P. Jones, Charleston; Robert J. Knopf, Saint Albans, all of W. Va.

[73] Assignee: Union Carbide Corporation, New York, N.Y.

[21] Appl. No.: 952,730

[22] Filed: Oct. 19, 1978

[51] Int. Cl.$^2$ .................... C08G 18/24; C08G 18/18; C08G 18/48; C08G 18/32
[52] U.S. Cl. ........................................ 528/54; 128/156; 128/284; 425/378 R; 528/44; 528/58; 528/60; 528/77; 528/904; 528/61; 525/359
[58] Field of Search .................. 528/904, 44, 77, 58, 528/54, 59, 61, 46; 521/905

[56] References Cited

U.S. PATENT DOCUMENTS

| | | | |
|---|---|---|---|
| 3,822,238 | 7/1974 | Blair et al. | 521/905 |
| 3,826,674 | 7/1974 | Schwarz | 521/905 |
| 3,939,105 | 2/1976 | Jones et al. | 260/2.5 AY |
| 3,939,123 | 2/1976 | Mathews et al. | 260/77.5 AM |
| 3,940,542 | 2/1976 | Knopf et al. | 428/364 |
| 3,975,350 | 8/1976 | Hudgin et al. | 521/905 |

*Primary Examiner*—H. S. Cockeram
*Attorney, Agent, or Firm*—George A. Skoler

[57] ABSTRACT

Continuous process for producing hydrogels by charging preselected feeds containing poly(oxyalkylene) polyols, organic diisocyanate and catalyst to a reaction zone followed by crosslinking by exposure to atmospheric humidity. Solvents are not used and the hydrogels are shaped in desired configuration as they exit the extruder.

7 Claims, No Drawings

PROCESS FOR PRODUCING SHAPED POLYURETHANE HYDROGEL ARTICLES

BACKGROUND OF THE INVENTION

Recently several patents issued disclosing new types of polyurethane hydrogel polymers and methods for their production; namely, U.S. Pat. No. 3,939,105, U.S. Pat. No. 3,939,123 and U.S. Pat. No. 3,940,542. In these patents the hydrogels are produced by methods involving the use of solvents. As a consequence additional costs are incurred and, also, steps to recover the solvents to avoid environmental pollution are required, which add to the cost of the product. The present invention relates to an improved process that eliminates the use of the solvents and can, if desired, produce the hydrogel polymers in the shaped form desired, such as film, fiber, rod, pellet, etc. As is known, hydrogels, due to their absorbency characteristics, have found many uses, usually in conjunction with other materials.

The use of fibrous materials as absorbents for moisture is a well known, widespread practice. In this application many of the natural and synthetic fibers have been used and extensive efforts have been made to improve their absorption properties. One of the major deficiencies of the natural and synthetic materials heretofore used has been their tendency to release the absorbed moisture when pressure has been applied to the moisture containing material. The fact that pressure causes the absorbed fluid to be expelled from the fibers is known as reversible absorption. For many applications, however, irreversible absorption is desired, for example, in surgical dressings, diapers, bed pads, catamenials, and the like, whereby the absorbed moisture is retained in the absorbent material under an applied pressure.

Within the past decade innovations have resulted in the production of hydrogels, which have such irreversible absorption properties, in powder or particulate form and even, in some instances, in film form using processes which require the use of solvents. An especially interesting characteristic of the hydrogel polymers is that when in contact with water they absorb it and swell to a certain point and then stop further absorption; however, the final swollen polymer is still similar in shape to its initial unswollen shape. Thus, many of the hydrogels have the ability to absorb many times their original weight in water without becoming soggy or deformed. In general, the hydrogels are used in conjunction with other materials as supports. Among other U.S. patents that have issued in this field are U.S. Pat. No. 3,669,103; U.S. Pat. No. 3,589,364; U.S. Pat. No. 3,694,301; U.S. Pat. No. 3,670,731; U.S. Pat. No. 3,164,565. This is but an exemplary listing and should not be considered complete.

SUMMARY OF THE INVENTION

The invention relates to a continuous method for producing water swellable, lightly crosslinked polyurethane hydrogel polymers that does not rely on the use of solvents and which produces the polymers in the desired form. In the process low viscosity separate selected feeds of the reactants are premixed and then immediately fed to the reactor for completion of the reaction. Upon existing from the reactor the polymer produced, now of extremely high viscosity, is shaped by using a suitable die configuration and lightly crosslinked as it contacts the ambient atmospheric humidity. During the reaction solvents are not used. The reactor can be an extruder or suitable tubular reactor. In the latter case, pressure must be employed to maintain the flow through the reaction system.

The water swellable, lightly crosslinked, polyurethane hydrogel polymers that are produced are the reaction products of an isocyanato terminated prepolymer comprising the reaction product of (i) poly(alkyleneoxy) polyols having an average molecular weight up to about 25,000 with (ii) organic diisocyanates, wherein said prepolymer is subsequently lightly crosslinked with (iii) a crosslinking agent that is water or an organic polyamine, the amount of crosslinking agent used being an equivalent amount based on the number of equivalents of isocyanato groups present in the prepolymer. In the processes of this invention the ambient atmospheric moisture has been found eminently suitable; as is known, this can also be controlled to establish any relative humidity concentration desired.

DESCRIPTION OF THE INVENTION

The process of this invention reacts the starting materials in neat form. The initial reactants have low Brookfield viscosities of from about 500 to about 2,500 cps, generally from about 1,000 to 1,500 cps, and upon completion of the reaction the products have a high Brookfield viscosity of from about 1,000,000 to 10,000,000, or greater.

The process of this invention produces lightly crosslinked, water swellable, polyurethane hydrogel polymers by a continuous solvent free formation and extrusion process. In this continuous process the neat components, which are poly(oxyalkylene) diols and higher polyols, organic diisocyanates and catalysts are fed to in-line mixers in the liquid state at a relatively low viscosity. The mixed components are then passed through an extruder or tubular reactor at a temperature sufficient to cause rapid reaction, during which the viscosity of the mixture is increased greatly and the isocyanato terminated prepolymer is produced. The highly viscous molten prepolymer is then extruded through appropriate extrusion dies into shaped articles or forms such as fibers, films, rods or pellets. On emergence from the die, the isocyanato terminated prepolymer crosslinks as it comes into contact with the moisture present in the surrounding atmosphere. Significant economic savings are realized in the practice of the process of this invention due to the absence of organic solvents. Not only is the cost due to loss of solvents eliminated but also eliminated are the costs associated with the equipment required to recover and recycle the solvent and to prevent environmental pollution and its operation. Further, the entire reaction sequence can be completed in a short time. It was completely unexpected and unobvious that the reaction should be carried out so effectively and so rapidly in the absence of a solvent.

In the process of this invention a plurality of feeds containing the poly(oxyalkylene) polyols, organic diisocyanate and catalyst is continuously fed into a suitable reactor means. Prior to entering the reactor the feeds are brought together and mixed until a homogeneous blend is obtained.

The reactor means can be any tubular type reactor such as an extruder or simple tubular reactor. These are well known to those skilled in the art. When using an extruder reactor, the screw is the reactant conveying means. However, in other tubular reactors pressure must be applied to maintain flow and move the reaction mixture continuously through the tubular reactor; this is conducted by known means and pressures up to about 5,000 psi or higher can be employed. Extreme pressures are not required since the pressure is used solely for conveyance purposes.

The reactants are introduced in the fluid form at temperatures of from about 20° C. to 100° C., preferably from about 60° C. to 90° C., and are then reacted at reaction temperatures sufficient to cause rapid reaction, generally from about 110° C. to 175° C., preferably from about 120° C. to 150° C.

The residence time in the reaction zone of the reaction means is an important factor in this process. This residence time varies from about 30 seconds to 3 minutes, preferably from 45 seconds to 2 minutes at the reaction temperature.

The compositions of the feed streams consist of the poly(oxyalkylene) polyols, the organic diisocyanate and the catalyst. At least two feed streams are required and there can be as many as four or more. In view of the reactivity of the reactants when they are all in contact with each other it is important not to have the catalyst in a mixture containing both polyol and isocyanate until the last possible moment before reaction is desired. Illustrative of a typical system using two feeds is one wherein the first feed contains a mixture of diol, triol and catalyst and the second feed contains a mixture of diol and diisocyanate. In another typical instance in which three feeds would be used, the first feed contains diol and triol, the second feed contains diol and diisocyanate and the third feed contains diol and catalyst. In all instances the reactants are free of entrained moixture due to the known reactivity of the isocyanato group with water; however, trace amounts up to a level of about 0.01% can be tolerated.

The process of this invention is carried out by initially preparing the separate required feed streams. These feed streams are then continuously fed into mixing means, generally in-line mixers, at predetermined amounts at temperatures of from about 20° C. to 100° C. to minimize reaction during mixing. After mixing the stream continues into the reactor means, preferably a screw extruder, and it is heated to a temperature of from about 110° C. to 175° C. In the reactor means the Brookfield viscosity of the resultant product increases tremendously into the millions of centipoises as the reaction progresses. The product, which is the isocyanato terminated prepolymer, is then extruded through appropriate extrusion dies. As the prepolymer exits from the die it is crosslinked as it comes into contact with the atmospheric moisture and one now has the final polyurethane hydrogel polymer in the shaped form desired, or one can then further cut or pelletize the extruded product. One can also, if one desires, extrude the prepolymer into a "box" or other suitable means in which the relative humidity is maintained at any desired level. The relative humidity suitable for use can vary from 10% to 100% and is preferably from 50% to 100%. One can also conduct the crosslinking reaction by extruding the molten isocyanato terminated prepolymer into a bath or vapors of an organic polyamine, as is known.

The in-line mixers that can be used are known and one can use a static mixer, a turbine blade mixer or any equivalent mixing means.

The poly(alkyleneoxy) polyols that are used in producing the isocyanato terminated prepolymers are those having a molecular weight up to about 25,000. These polyols can be diols, triols or tetrols, with the molecular weight of the polyol varying depending upon which is used.

The suitable diols are the poly(ethyleneoxy) glycols which have a molecular weight of from about 4,000 to about 25,000, preferably from about 6,000 to about 10,000. These diols are well known and many are commercially available. Minor amounts, preferably up to about 35 weight percent, of a poly(propyleneoxy) glycol or a poly(butyleneoxy) glycol can also be present. The polyols can be block or random copolymers containing mixtures of ethyleneoxy, propyleneoxy, or butyleneoxy units.

The triols and tetrols that can be used are those having a molecular weight of from about 92 to about 5,000, preferably from about 500 to about 1,500. These can be the poly(alkyleneoxy) polyols wherein the alkyleneoxy group contains from 2 to 4 carbon atoms and they can be homopolymers or block or random copolymers having three or four reactive hydroxyl groups. One can also use the aliphatic polyhydroxyl compounds of the formula $C_nH_{2n+2-m}(OH)_m$ wherein n is an integer having a value of from 3 to 6 and m has a value of 3 or 4.

Illustrative of the suitable polyols are poly(ethyleneoxy) diol, poly(propyleneoxy) diol, poly(butyleneoxy) diol, copoly(ethyleneoxy-propyleneoxy) diol, poly(ethyleneoxy triol, poly(ethyleneoxy) tetrol, poly(propyleneoxy) triol, copoly(ethyleneoxy-propyleneoxy) triol, copoly(ethyleneoxy-butyleneoxy) triol, glycerine, sorbitol, 1,2,6-hexanetriol, trimethylolpropane, pentaerythritol, dipentaerythritol, and the like. The alkyleneoxy adducts of the mono or polyamines such as ethylamine, ethanolamine, diethanolamine, ethylenediamine, propylenediamine, isopropanolamine, hexamethylenediamine, and the like, or mixtures thereof, can be used if desired. In addition, one can include some polycaprolactone polyol or conventional polyester polyol.

The isocyanato terminated prepolymers can be produced by reacting the poly(alkyleneoxy) polyol with the organic polyisocyanate. In a typical embodiment, the isocyanato terminated prepolymers can be produced by reacting a mixture of poly(alkyleneoxy) diol and poly(alkyleneoxy) triol and/or tetrol with the organic diisocyaante. When a mixture of polyols is used in producing the hydrogels the mole ratio of the diol to the higher polyols is at least about 6:1 and can be as high as about 40:1. Preferably this mole ratio is from about 15:1 to about 30:1, and more preferably from about 20:1 to about 25:1. It has been observed that the mole ratio of diol to higher polyol has an effect on water uptake; the higher the mole ratio, the higher the water uptake.

Any of the known organic diisocyanates can be used in the reaction with the polyol to produce the isocyanato terminated prepolymer. These isocyanates are well known to those skilled in the polyurethane art and illustrative thereof one can mention, tolylene diisocyanate, phenylene diisocyanate, hexamethylene diisocyanate, isophorone diisocyanate, methylene bis(4-phenylisocyanate), 4,4'-methylenebis(o-tolylene isocyanate), dimer acid diisocyanate, 2,2,4-trimethylpentane diisocyanate, aniline-formaldehyde polyisocyanates having an average of from about 2 to about 3 isocyanato groups per molecule. If desired a small amount of higher functionality polyisocyanates can be present. In producing the isocyanato terminated prepolymer one reacts an excess of the polyisocyanate with the polyol.

The ratio of isocyanato groups to hydroxyl groups is from about 1.05 to 2 equivalents, preferably 1.15 to 1.5 equivalents, of isocyanato per equivalent of hydroxyl. An equivalent amount of isocyanato groups sufficient to react with any water present in the reactants can also be added. It has been observed that at the lower ratios the final hydrogel polymer becomes too soluble, while at ratios above 1.6:1 the water uptake of the final hydrogel decreases. In this reaction any of the known catalysts can be used, such as, dibutyltin dilaurate, stannous octoate, triethylenediamine, lead octoate, bis(dimethylamine) ethyl ether, and the like. The catalyst is present at a concentration of from about 0.001 to about one percent by weight. The conventional catalytic amounts are employed.

The following examples are illustrative of the invention.

EXAMPLE 1

Feed I

A mixture of 3,240 g. of a poly(oxyethylene diol having an average hydroxyl number of 14.64, 18.94 g. of a poly(oxyethylene) triol having an average hydroxyl number of 141.5 and 650 g. of trichloroethylene was heated at 65° C. to 130° C. for 3.5 hours to azeotropically remove 13.4 g. of water. The trichloroethylene was stripped at reduced pressure to a temperature of 140° C. The contents of the reaction vessel were cooled, transferred to a feed tank under dry nitrogen atmosphere and maintained at 70° C.

Feed II

A 1,000 g. portion of the same diol used in Feed I was azeotropically distilled using 200 g. of trichloroethylene to remove 4.6 g. of water over a period of about 1.7 hours and then the trichloroethylene was stripped in the same manner as described for Feed I. The contents of the reactor were cooled to about 90° C. and 1,000 g. of methylenebis(4-phenylisocyanate) were added to produce a 1:1 mixture of diol and diisocyanate. The contents were transferred to a second feed tank under dry nitrogen atmosphere and maintained at 70° C.

Feed III

A 1,000 g. portion of the same diol used in Feed I was azeotropically distilled as described for Feed II; 3.8 g. of water was removed over a period of about one hour. After stripping the trichloroethylene the contents were cooled to about 100° C. and 3 g. of dibutyltin dilaurate were added. After mixing thoroughly the contents were transferred to a third feed tank under dry nitrogen atmosphere and maintained at 70° to 80° C.

The three feeds were introduced to an extruder, wherein the reaction occurred, via a system of gear type metering pumps and static mixers. The reaction was carried out by metering 17.7302 g/min. of Feed I and 1,3662 g./min. of Feed II through two in-line mixers (each about 30 cm. long and 1.77 cm. in diameter—21 static elements) arranged in series. After exiting from the second mixer, 2.16267 g. of Feed III was metered into the flowing Feed I/Feed II stream and then the entire mixture was continuously passed through a second series of two more in-line mixers. Thus, a total of 21.25907 g. of reaction mixture was being fed to the extruder reactor every minute having a diol to triol molar ratio of 3.62:1, an NCO:OH equivalent ratio of 1.019:1, a catalyst concentration of 0.03 weight percent, and a Brookfield viscosity of about 1,500 cps at 70° C.

As the flow of reactants exited from the fourth in-line mixer it passed into an extruder having a 1.9 cm. bore, a free barrel volume of about 30 ml. and a single chrome plated screw. The reactants mixture entered a first zone of the extruder heated at 70° C. for about 6 cm. of the screw length and then proceeded on into a second reaction zone maintained at 142° to 146° C. (front-back) which was about 18.5 cm. in length. The extruder screw was rotated at 24 rpm and the residence time in the reaction zone was 93.6 seconds. The isocyanato terminated prepolymer produced was highly viscous (estimated as having a Brookfield viscosity greater than 8,000,000 cps at about 120° C.) and was extruded from the extruder as a film through a heated (120° C.) stainless steel die having a 7.62 cm. diameter slit of 0.0635 cm. width. As the film exited from the extruder it was crosslinked to the hydrogel polymer by contact with the ambient room humidity conditions; the relative atmospheric humidity was about 70 percent. After cooling to room temperature the polyurethane hydrogel film produced was tough, strong, transluscent, of light straw color and about 6.35 cm. wide and 1.02 mm. thick. Two specimens of the film were taken at different times during the reaction. One specimen absorbed 20 times its weight of water upon immersion in water for 24 hours and was water soluble to the extent of 10 weight percent when immersed for 24 hours at 22° C. The values for the second specimen were 17.6 times and 4.4 weight percent, respectively.

EXAMPLE 2

Feed I

A mixture of 3,000 g. of a poly(oxyethylene) diol having an average hydroxyl number of 13.42 and 18.56 g. of a poly(oxyethylene) triol having an average hydroxyl number of 141.5 was azeotropically distilled for 2 hours using trichloroethylene, as described in Example 1, to remove 6.2 g. of water. The trichloroethylene was stripped at reduced pressure of 18 mm Hg to a kettle temperature of 130° C. and the contents were then cooled to 95° C. and 1.5093 g of triethylene diamine were added. After thorough mixing, the contents were transferred to a feed tank under dry nitrogen atmosphere and maintained at 80° C.

Feed I

A 1,000 g. portion of the same diol used in Feed I was azeotropically distilled using 200 g. of trichloroethylene to remove 4.2 g. of water over a period of 1.5 hours; then the trichloroethylene was stripped. The contents of the reactor was cooled to 75° C. and 1,000 g. of methylenebis(4-phenylisocyanate) were added and thoroughly mixed. The contents were transferred to a second feed tank under dry nitrogen atmosphere and maintained at 80° C.

Hydrogel Polymer A

In this example 39.2323 g. of Feed I and 3.2447 g. of Feed II were pumped using gear type metering pumps and joined before entering an in-line turbine blade mixer in which the reactants are thoroughly mixed and which are attached to and discharged into the extruder reactor described in Example 1. The turbine blades of the mixer were rotating at about 625 rpm and the temperature in the mixer was maintained at 90° C. A total of 42.48 g. of the reaction mixture was being fed to the extruder reactor every minute having an NCO:OH equivalent ratio of 1.3:1 and a Brookfield viscosity of about 1,500 cps at 70° C. During the reaction the first zone of the extruder was maintained at 90° C. and the second reaction zone at 120° C. The residence time in the second reaction zone was 46.6 seconds. The isocyanato terminated prepolymer produced was highly viscous (Brookfield viscosity greater than 6,000,000 cps at 120° C.) and was extruded onto glass plates and rolled with a forming blade to film form. As the film extruded and was rolled it was crosslinked to the hydrogel polymer as described in Example 1.

Hydrogel Polymer B

Following the procedure described for Hydrogel Polymer A, 38.2381 g. of Feed I and 3.4155 g. of Feed II were reacted to produce a polyurethane hydrogel polymer. In this instance 41.65 g. per minute were fed to the extruder reactor and the NCO:OH equivalent ratio was 1.4:1.

In both instances the films were tough, strong and transluscent. The water uptake and solubility are tabulated below:

| Hydrogel Polymer | A | B |
|---|---|---|
| Water absorption, times | 32.0;29.5 | 13.5;10.2 |
| Water solubility, % | 32.5;33.0 | 22.9;15.0 |

EXAMPLE 3

Feed I

A mixture of 3,000 g. of a poly(oxyethylene)diol having an average hydroxyl number of 13.42 and 15.72 g. of a poly(oxyethylene)triol having an average hydroxyl number of 167 was azeotropically distilled for about 2.5 hours using benzene as the azeotroping agent to remove 9.2 g. of water. The benzene was stripped at reduced pressure, the contents were then cooled to 92° C. and 1.5 g. of triethylene diamine were added. After thorough mixing, the contents were transferred to a feed tank under dry nitrogen atmosphere and maintained at about 80° C.

Feed II

A 3,000 g. portion of the same diol used in Feed I was azeotropically distilled using benzene to remove about 9.7 g. of water over a 2.5 hours period and then the benzene was stripped. The contents of the reactor were cooled to 75° C. and methylenebis(4-phenylisocyanate) was added to give a 50/50 mixture, thoroughly mixed and transferred to a second feed tank under dry nitrogen atmosphere and maintained at about 80° C.

Feeds I and II, which were very fluid, were used to produce a series of isocyanato terminated prepolymers in an extruder reactor and then converted to the polyurethane hydrogel polymer. In this series of reactions the two feed streams were separately fed to opposite sides of the in-line turbine mixer, which was rotated at about 625 rpm and maintained at 70° C. The isocyanato terminated prepolymers produced were extruded at 120° C. as continuous rods onto a conveyer belt, moving at 10 fpm, through a 0.635 cm. die, cooled, and collected in coils. As the rod exited the extruder it was crosslinked to the polyurethane hydrogel polymer by the ambient atmospheric moisture. The specific conditions under which each hydrogel polymer was produced and its properties are tabulated below.

| Hydrogel Polymer | A | B | C |
|---|---|---|---|
| Feed I, g/min. | 32.92 | 24.69 | 20.58 |
| Feed II, g/min. | 2.851 | 2.138 | 1.782 |
| Diol:Triol, molar ratio | 23.8:1 | 23.6:1 | 23.9:1 |
| NCO:OH, equiv. ratio | 1.31:1 | 1.31:1 | 1.31:1 |
| Extruder Temp., °C. | | | |
| Zone 1 | 70 | 70 | 70 |
| Zone 2 | 130 | 121 | 121 |
| Residence Time in | | | |
| Zone 2, sec. | 55.3 | 73.8 | 88.5 |
| Properties of Rods | | | |
| Water absorption, times | 23.85 | 14.4 | 14.87 |
| Water solubility, % | 4.15 | 3.15 | 2.88 |

The Brookfield viscosities of the extrudates as they exited from the die were estimated at from one to two million for Hydrogel Polymer A and greater than 8,000,000 for Hydrogel Polymers B and C. The extruded rods were strong, flexible and very light straw colored. They were readily ground, cut or pelletized.

After the extrusion of the rods, portions were hand drawn at 23° C. into strong, flexible filaments having good appearance. The average properties of the fibers so produced indicate that fibers with good textile properties can be produced continuously.

| Hydrogel Polymer | A | A | A | B | B |
|---|---|---|---|---|---|
| Denier | 210 | 1028 | 2006 | 5543 | 7130 |
| Tenacity, gpd | 2.59 | 1.79 | 1.52 | 1.41 | 2.28 |
| Elongation to Break, % | 55 | 73 | 76 | 64 | 74 |

EXAMPLE 4

In this experiment the effect of different ambient atmospheric humidity conditions on the water absorption and solubility properties of the polyurethane hydrogel polymer were demonstrated. The final crosslinking was effected at 22% and 78% relative humidities, determined by a hygrometer positioned about six inches from the extruder exit.

Run 4A

Feed I

A mixture of 3,000 g. of a poly(oxyethylene)diol having an average hydroxyl number of 13.42 and an average molecular weight of 8,360 and 15.7 g. of a poly(oxyethylene)triol having an average hydroxyl number of 167 and an average molecular weight of 667 was azeotropically distilled for about 3 hours using benzene as the azeotroping agent to remove the water. The benzene was stripped, the contents were cooled to 100° C. and 1.8 g. of triethylene diamine were added. After thorough mixing the mixture was transferred to a feed tank under dry nitrogen atmosphere and maintained at 70° C.

Feed II

An 800 g. portion of the same diol used in Feed I was azeotropically distilled in the same manner to remove the water over a 3 hour period. After removal of the azeotroping agent and cooling to 100° C., 800 g. of methylenebis(4-phenylisocyanate) were added, thoroughly mixed and the mixture was transferred to a second feed tank under dry nitrogen atmosphere and maintained at about 70° to 80° C.

The isocyanato terminated prepolymer was produced by reacting 29.86 g/min. of Feed I and 2.85 g/min. of Feed II by the procedure described in Example 3. The diol:triol molar ratio in the feeds was 23.76:1 and the NCO:OH equivalent ratio was 1.44:1. During the reaction the first zone of the extruder was maintained at 70° to 80° C. and the second reaction zone at 130° C. The residence time of the reactants in the second reaction zone was 60.5 seconds. Two runs were performed under similar conditions. In the first run the relative humidity at the extruder exit for effecting crosslinking was 22% (Run 4A/22) and in the second run it was 78% (Run 4A/78). In both instances rods were produced that were strong, flexible and light straw colored.

Run 4B

Feed III

In this feed a mixture of 2,000 g. of the same diol and 20.93 g. of the same triol used in Feed I was azeotropically distilled in the same manner and then 2 g. of triethylene diamine were added before the mixture was transferred to the feed tank.

Feed IV

In this feed 2,000 g. of the same diol was azeotropically distilled as described for Feed II and then 176.36 g. of methylenebis(4-phenylisocyanate) were added before the mixture was transferred to a separate feed tank.

The isocyanato terminated prepolymer was produced in the same manner as for Run 4A by reacting 28.07 g/min. of Feed III and 2.32 g/min. of Feed IV. The diol:triol molar ratio was 21.26:1 and the NCO:OH equivalent ratio was 1.4:1. The temperature in the second reaction zone of the extruder was 125° C. and the residence time therein was 64.5 seconds. Again, two runs were performed, the first run undergoing crosslinking at a relative humidity of 22% (Run 4B/22) and the second run at 78% (Run 4B/78).

In all runs carried out in this example the initial feeds had Brookfield viscosities of about 1,500 cps at 70° C. and when exiting from the extruder, but before crosslinking, the isocyanato terminated prepolymers had Brookfield viscosities greater than 6,000,000 cps at about 120° C.

The effect of the humidity conditions on the extent of crosslinking and, therefore, the water absorption and water solubility properties was quite noticeable. Portions of Runs 4A and 4B crosslinked at the two relative humidities were hand-stretched into strands and their properties were determined. The hydrogel polymers produced at the higher relative humidity had general overall improved properties as evidenced by lower solubility.

| Run | 4A/22 | 4A/78 | 4B/22 | 4B/78 |
|---|---|---|---|---|
| Water absorption, times | 8.9 | 35.0 | — | — |
| Water solubility, % | 38.4 | 18.7 | 25.8 | 9.63 |

A sample of the Run 4B hydrogel polymer was also converted to a film and evaluated; again, significantly improved properties were noted with the hydrogel polymer film produced at the higher relative humidity conditions.

| Run | 4B/22 | 4B/78 |
|---|---|---|
| Water absorption, times | 25.7 | 28.9 |
| Water solubility, % | 36.5 | 16.4 |

What we claim is:

1. A continuous, solventless process for producing water swellable, lightly crosslinked, hydrogel polymer comprising the steps of:
   (a) preparing a plurality of at least two feed compositions consisting of poly(oxyalkylene)polyol, organic polyisocyanate and catalyst, with the provisos that the catalyst is not in the same composition in which both of the poly(oxyalkylene)polyol and organic polyisocyanate are present and that the feed compositions are devoid of organic solvents,
   (b) feeding metered amounts of each of the feed compositions continuously through at least one in-line mixer to achieve uniform, homogeneous mixture,
   (c) continuously feeding the said uniform, homogeneous mixture into the inlet end and through tubular reactor means and producing an isocyanato terminated prepolymer of high specific viscosity,
   (d) extruding the said isocyanato terminated prepolymer through appropriate dies at the exit of said tubular reactor to form a shaped article,
   (e) lightly crosslinking said shaped article as it exits said tubular reactor with an equivalent amount of a crosslinking agent of the group water or organic polyamine; and
   (f) recovering the shaped polyurethane hydrogel polymer article produced; wherein said isocyanato terminated prepolymer comprises the reaction product of:
      (i) a poly(oxyalkylene) polyol having an average molecular weight up to about 25,000, wherein the alkyleneoxy group contains from 2 to 4 carbon atoms, and
      (ii) an organic polyisocyanate, and, further, wherein said poly(alkyleneoxy) polyol is a mixture of a major amount of poly(ethyleneoxy)diol having an average molecular weight of from about 4,000 to about 25,000 and a minor amount of poly(alkyleneoxy) triol or poly(alkyleneoxy) tetrol or aliphatic polyhydroxyl compound of the formula $C_nH_{2n+2-m}(OH)_m$ wherein n has a value of 3 to 6 and m has a value of 3 to 4, or mixtures thereof, said triol or tetrol having an average molecular weight of from about 92 to 5,000, wherein the mole ratio of diol to higher polyol in said mixture is from about 6:1 to 40:1; and wherein the equivalents ratio of isocyanato groups to hydroxyl groups is from about 1.05:1 to about 2:1; and wherein said polyamine is a primary or secondary diamine or triamine and wherein the equivalents of reactive crosslinking groups in said crosslinking agent used is equivalent to the number of equivalents of isocyanato groups present in said prepolymer.

2. A process as claimed in claim 1, wherein the temperature in the reaction zone of said tubular reactor means is from about 110° C. to about 175° C.

3. A process as claimed in claim 1, wherein the equivalents ratio of isocyanato groups to hydroxyl groups is from 1.15:1 to 1.5:1.

4. A process as claimed in claim 1, wherein said plurality of feed compositions consists of a first feed composition containing said poly(oxyalkylene) diol, said poly(oxyalkylene) triol and said catalyst and a second feed composition containing said poly(oxyalkylene) diol and said organic diisocyanate.

5. A process as claimed in claim 4, wherein said first feed composition contains poly(oxyethylene) diol having an average hydroxyl number of about 13, a poly(oxyethylene) triol having an average hydroxyl number of about 170 and triethylene diamine catalyst and said second feed composition contains poly(oxyethylene) diol having an average hydroxyl number of about 13 and methylenebis(4-phenylisocyanate).

6. A process as claimed in claim 1, wherein said plurality of feed compositions consists of a first feed composition containing said poly(oxyethylene) diol and said poly(oxyethylene) triol, a second feed composition containing said poly(oxyethylene) diol and said organic diisocyanate, and a third feed composition containing said poly(oxyethylene) diol and said catalyst.

7. A process as claimed in claim 6, wherein said first feed composition contains poly(oxyethylene) diol having an average hydroxyl number of about 15 and a poly(oxyethylene) triol having an average hydroxyl number of about 140, said second feed composition contains poly(oxyethylene) diol having an average hydroxyl number of about 15 and methylenebis(4-phenylisocyanate) and said third feed composition contains poly(oxyethylene) diol having an average hydroxyl number of about 15 and dibutyltin dilaurate.

* * * * *